United States Patent
Hyama et al.

(10) Patent No.: US 7,460,164 B2
(45) Date of Patent: Dec. 2, 2008

(54) IMAGE CAPTURE DEVICE HAVING AMPLIFICATION CIRCUIT FOR AMPLIFYING SIGNAL FROM PHOTOELECTRIC CONVERSION PORTION

(75) Inventors: Hiroki Hyama, Zama (JP); Akira Okita, Yamato (JP); Hideaki Takada, Atsugi (JP); Katsuhito Sakurai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 11/040,389

(22) Filed: Jan. 21, 2005

(65) Prior Publication Data

US 2005/0168603 A1 Aug. 4, 2005

(30) Foreign Application Priority Data

Jan. 29, 2004 (JP) .............................. 2004-021689

(51) Int. Cl.
- *H04N 5/335* (2006.01)
- *H04N 5/217* (2006.01)
- *H01L 31/062* (2006.01)
- *H01L 27/00* (2006.01)

(52) U.S. Cl. ........................ 348/300; 348/241; 348/308; 348/314; 348/316; 257/292; 250/208.1

(58) Field of Classification Search ................. 348/300, 348/311, 302, 241, 308, 316; 257/292; 250/208.1
See application file for complete search history.

(56) References Cited

U.S. PATENT DOCUMENTS

| | | | | |
|---|---|---|---|---|
| 4,556,910 A | * | 12/1985 | Tisue | 348/241 |
| 5,909,026 A | * | 6/1999 | Zhou et al. | 348/317 |
| 6,128,039 A | * | 10/2000 | Chen et al. | 348/294 |
| 6,747,264 B2 | * | 6/2004 | Miida | 348/300 |
| 6,831,690 B1 | * | 12/2004 | John et al. | 348/302 |

FOREIGN PATENT DOCUMENTS

| | | |
|---|---|---|
| JP | 02-296470 A | 12/1990 |
| JP | 08-004127 A | 1/1996 |
| JP | 2003-051989 A | 2/2003 |

\* cited by examiner

*Primary Examiner*—Nhan T Tran
(74) *Attorney, Agent, or Firm*—Canon USA Inc IP Division

(57) ABSTRACT

An image capture device includes a plurality of image capture elements for capturing an object image, a plurality of vertical output lines for reading signals out of the plurality of image capture elements, and a plurality of processing circuits. Each processing circuit includes a first capacitor element having a first electrode connected to one of the plurality of vertical output lines, a differential amplifier having a first input terminal connected to a second electrode of the first capacitor element, a second capacitor element connected between the first input terminal and an output terminal of the differential amplifier, and a first switch configured to control conduction between the first input terminal and the output terminal of the differential amplifier. The image capture device further includes a plurality of third capacitor elements configured to hold signals from the differential amplifiers of the plurality of processing circuits and to limit an output frequency band of each differential amplifier, and a horizontal output line for sequentially outputting signals from the plurality of third capacitor elements.

9 Claims, 9 Drawing Sheets

IMAGE CAPTURE DEVICE HAVING AMPLIFICATION CIRCUIT FOR AMPLIFYING SIGNAL FROM PHOTOELECTRIC CONVERSION PORTION

BACKGROUND OF THE INVENTION

1. Field of the Invention

The present invention relates to an image capture device for use with a scanner, a video camera, a digital still camera, etc.

2. Description of the Related Art

Image capture devices called "CMOS sensors" utilizing CMOS (complementary metal-oxide semiconductor) process have received attention in recent years. The CMOS sensors are expected to be especially useful in the field of portable information apparatuses because they can be easily loaded with peripheral circuits and they can be driven at relatively low voltages.

Japanese Laid-Open Patent Application No. 2-296470 discloses a photoelectric converter that has an amplification stage between pixels and storage capacitors for the purpose of attaining an increased S/N (signal-to-noise) ratio of the CMOS sensor. FIG. 7 is a diagram showing an equivalent circuit of the photoelectric converter disclosed in Japanese Laid-Open Patent Application No. 2-296470. In FIG. 7, MOS transistors M1 and M2 constitute a grounded-source amplifier. The grounded-source amplifier amplifies pixel signals input to the gate of the MOS transistor M1 and supplies the amplified pixel signals to storage capacitors CT1 and CT2. The storage capacitors CT1 and CT2 temporarily store the amplified pixel signals. Thus, pixel signals are amplified before being stored in the storage capacitors CT1 and CT2. Accordingly, the photoelectric converter can be prevented from being affected by circuit noise occurring at output lines S1 and S2 and subsequent stages. Therefore, the S/N ratio of the CMOS sensor can be improved.

For example, in a typical image capture device, an output amplifier is provided next to the output lines S1 and S2 so as to drive an external load. In this case, the output amplifier is required to exhibit wide bandwidth capability because it needs to follow high readout frequencies. Therefore, the output amplifier is a potential source of large noise. However, providing the grounded-source amplifier as described above can dramatically reduce the influence of noise generated at the output amplifier.

In Japanese Laid-Open Patent Application No. 2-296470, the photoelectric converter has two storage capacitors CT1 and CT2. Although not specifically described in Japanese Laid-Open Patent Application No. 2-296470, the two storage capacitors may be configured to store different outputs, as disclosed, for example, in Japanese Patent Publication No. 8-4127. More specifically, one storage capacitor stores an output corresponding to a reset state of every pixel, and the other storage capacitor stores an output corresponding to a read-out photoelectric signal. Then, the two outputs are subjected to difference processing at the subsequent stage, so that noise caused by a dark signal error of every pixel can be removed to some extent.

In the above-described photoelectric converter disclosed in Japanese Laid-Open Patent Application No. 2-296470, the stage subsequent to horizontal output lines obtains a difference between an output corresponding to a reset state of every pixel and an output corresponding to an image signal. Thus, a single final-stage circuit performs difference processing on signals from all pixels. This may decrease processing speed in some cases. In addition, a problem arises in that it is impossible to employ a difference circuit requiring long processing time.

SUMMARY OF THE INVENTION

The present invention is directed to an image capture device in which a rate of removal of noise resulting from variations of pixels is improved and a high S/N ratio is attained at the time of setting of high sensitivity.

In an aspect of the present invention, an image capture device comprises a plurality of image capture elements for capturing an object image, a plurality of vertical output lines for reading signals out of the plurality of image capture elements, a plurality of processing circuits, each processing circuit including a first capacitor element having a first electrode connected to one of the plurality of vertical output lines, a differential amplifier having a first input terminal connected to a second electrode of the first capacitor element, a second capacitor element connected between the first input terminal and an output terminal of the differential amplifier, and a first switch configured to control conduction between the first input terminal and the output terminal of the differential amplifier, a plurality of third capacitor elements configured to hold signals from the differential amplifiers of the plurality of processing circuits and to limit an output frequency band of each differential amplifier, and a horizontal output line for sequentially outputting signals from the plurality of third capacitor elements.

The above and further features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Embodiment

Figure 1:
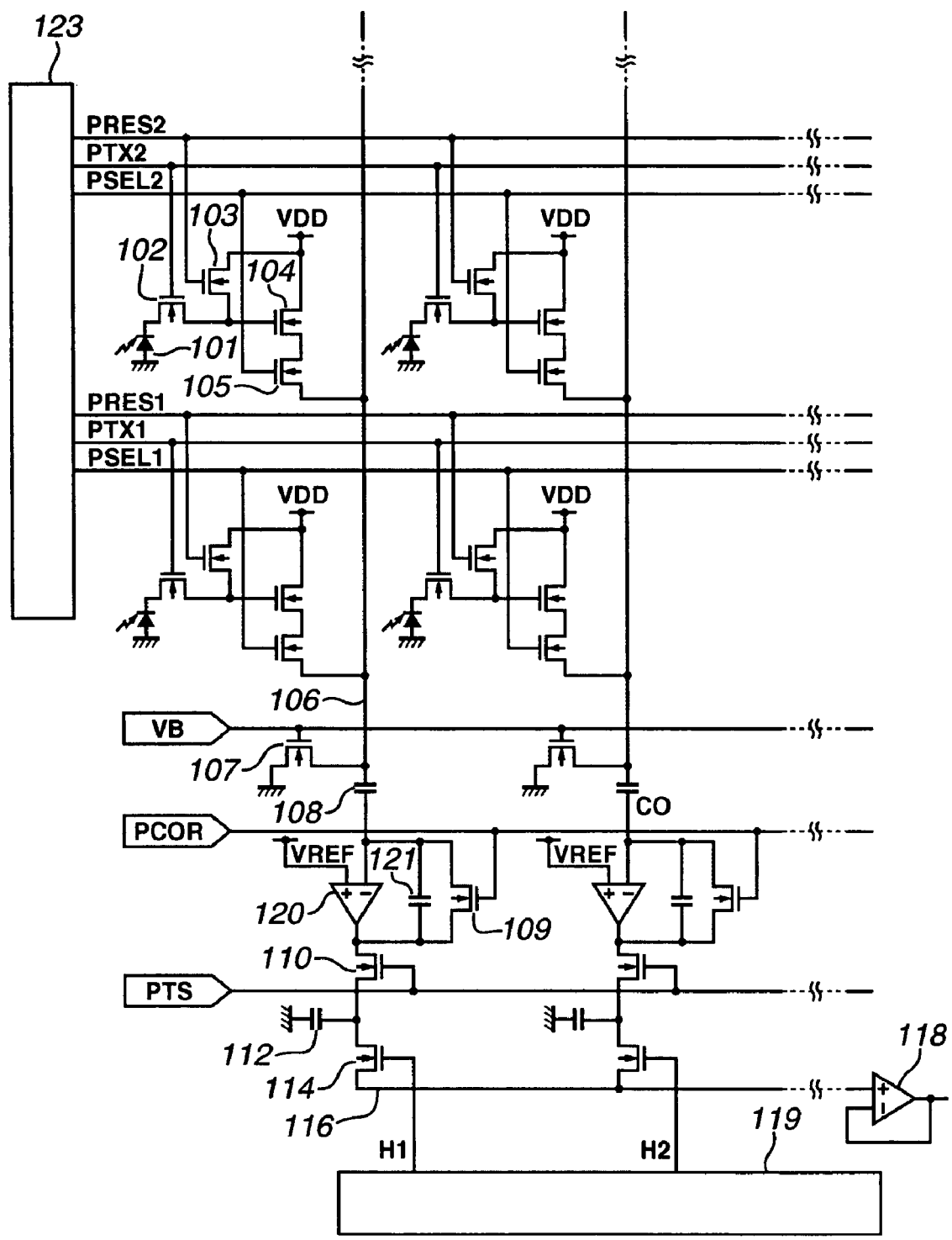
FIG. 1 is a diagram showing an equivalent circuit of an image capture device according to a first embodiment of the invention.

FIG. 1 is a diagram showing an equivalent circuit of an image capture device according to a first embodiment of the invention. In particular, FIG. 1 illustrates a portion of the image capture device associated with 2×2 pixels (image capture elements) among a plurality of two-dimensionally arranged pixels.

In FIG. 1, a unit pixel includes a photodiode 101, a pixel transfer switch 102, a reset switch 103, an amplification MOSFET (metal-oxide semiconductor field-effect transistor) 104, and a row selection switch 105.

The photodiode 101 serves a photoelectric conversion element. The amplification MOSFET 104 amplifies a signal generated by the photodiode 101. The reset switch 103 resets, to a predetermined voltage, an input to the amplification MOSFET 104. The row selection switch 105 controls conduction between a source electrode of the amplification MOSFET 104 and a vertical output line 106. The pixel transfer switch 102 controls conduction between the photodiode 101 and a gate electrode of the amplification MOSFET 104.

Each column of pixels is provided with a clamping capacitor 108, an operational amplifier 120, a feedback capacitor 121, a clamping switch 109, and a transfer gate 110. In the first embodiment, the clamping capacitor 108, the operational amplifier 120 and the clamping switch 109 constitute a correction circuit. The clamping capacitor 108, the operational amplifier 120 and the feedback capacitor 121 constitute an amplification circuit. Thus, the clamping capacitor 108 and the operational amplifier 120, which are parts of the correction circuit and the amplification circuit, are shared by these circuits.

Figure 2:
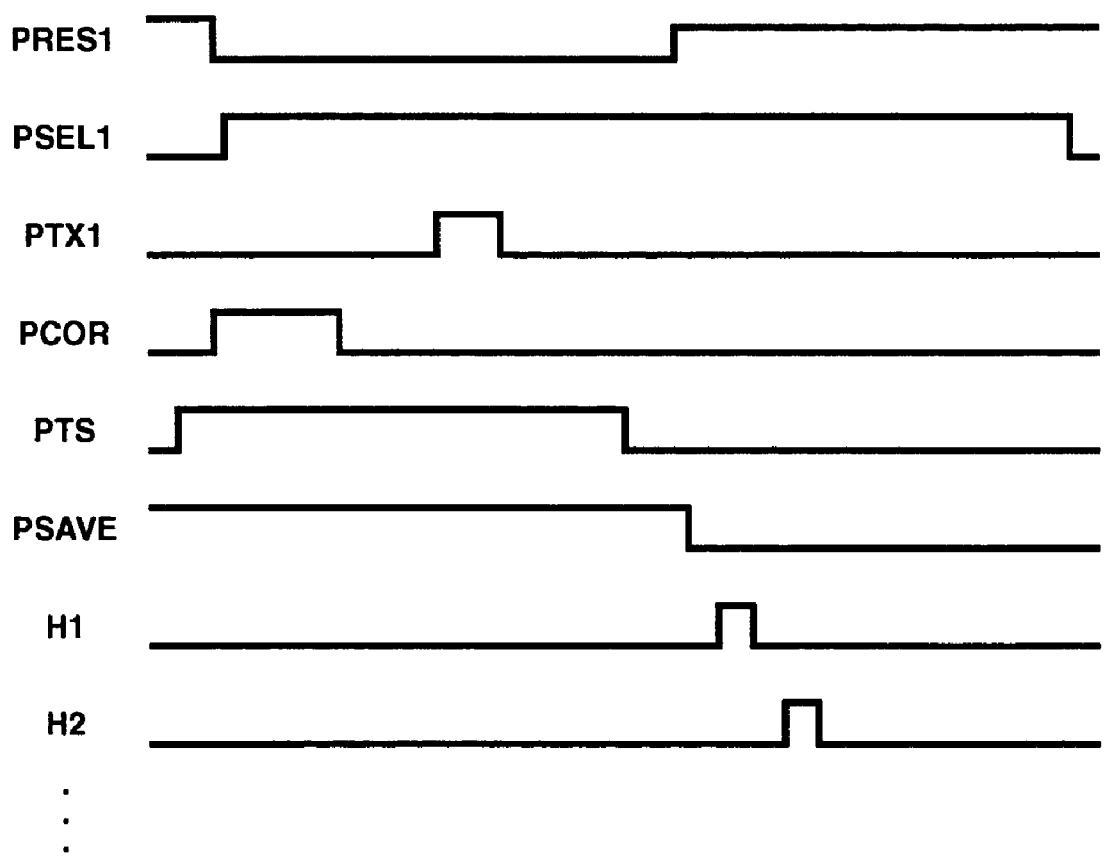
FIG. 2 is a timing chart illustrating driving pulses for use in the image capture device according to the first embodiment.

Operation of the image capture device is described in detail below with reference to FIG. 2. FIG. 2 is a timing chart illustrating driving pulses for use in the image capture device according to the first embodiment. Prior to a readout operation, photoelectric charge is accumulated at the photodiode 101 for a predetermined exposure period. With respect to a row of pixels selected by a vertical scanning circuit 123, a pixel reset pulse PRES (PRES1 in FIGS. 1 and 2) applied to the reset circuit 103 first changes from a high-level state to a low-level state, so that a reset state of the gate electrode of the amplification MOSFET 104 is cancelled. In this instance, a voltage corresponding to a dark condition (dark signal) is held at a parasitic capacitance (hereinafter referred to as "CFD") of every pixel including the gate electrode of the amplification MOSFET 104.

When a row selection pulse PSEL (PSEL1 in FIGS. 1 and 2) applied to the row selection switch 105 changes from a low-level state to a high-level state, a dark signal is generated on the vertical output line 106. In this instance, the operational amplifier 120, which serves as an amplification device, is in a voltage-follower state, so that the output of the operational amplifier 120 is approximately equal to a reference voltage VREF.

After a predetermined period of time has elapsed, a clamping pulse PCOR applied to the clamping switch 109 changes from a high-level state to a low-level state, so that the dark signal output on the vertical output line 106 is clamped as a reference. Subsequently, the pixel transfer switch 102 is kept at a high-level state for a predetermined period of time in response to a pulse PTX (PTX1 in FIGS. 1 and 2). Accordingly, photoelectric charge accumulated in the photodiode 101 is transferred to the gate electrode of the amplification MOSFET 104.

In this condition, the transferred charge is caused by electrons. Let Q be the absolute value of the amount of transferred charge. Then, the gate potential of the amplification MOSFET 104 decreases by "Q/CFD". Correspondingly with this change, a voltage corresponding to an illuminated condition (illuminated-condition signal) is generated on the vertical output line 106. Let Gsf be the source-follower gain of the amplification MOSFET 104. Then, the amount of change $\Delta Vvl$ of the potential $Vvl$ of the vertical output line 106 from the dark signal is expressed by the following equation (1):

$$\Delta Vvl = -\frac{Q}{CFD} \cdot Gsf \tag{1}$$

This potential change is amplified by an inverting amplifier circuit that is composed of the operational amplifier 120, the clamping capacitor 108 and the feedback capacitor 121. The output Vct of the inverting amplifier circuit is expressed by the following equation (2) in combination with the equation (1):

$$Vct = VREF + \frac{Q}{CFD} \cdot Gsf \cdot \frac{C0}{Cf} \tag{2}$$

where C0 represents the capacitance of the clamping capacitor 108, and Cf represents the capacitance of the feedback capacitor 121.

In the equation (2), the second term represents a photoelectric signal component. The clamping operation of the clamping capacitor 108 prevents pixel-to-pixel dark signal errors from affecting the output Vct. In the case of a conventional image capture device disclosed in Japanese Laid-Open Patent Application No. 2-296470, the rate of removal of noise resulting from dark signal errors is limited by the relative precision of two storage capacitors. On the other hand, in the image capture device according to the first embodiment of the invention, a very high rate of removal can be attained by the above-described clamping operation.

The voltage expressed by the equation (2) is stored in a storage capacitor 112, which is provided for each column of pixels. After that, horizontal transfer switches 114 are sequentially selected in response to scanning pulses H1, H2 . . . that are generated by a horizontal shift register 119. Accordingly, signals stored in the storage capacitors 112 are sequentially read out to a horizontal output line 116 and are then supplied to an output amplifier 118. The output amplifier 118 amplifies and outputs these signals. While, in the first embodiment, the output amplifier 118 acts as a voltage follower, its voltage amplification factor may be set to an appropriate value to adjust the amplitude of output signals.

Figure 3:
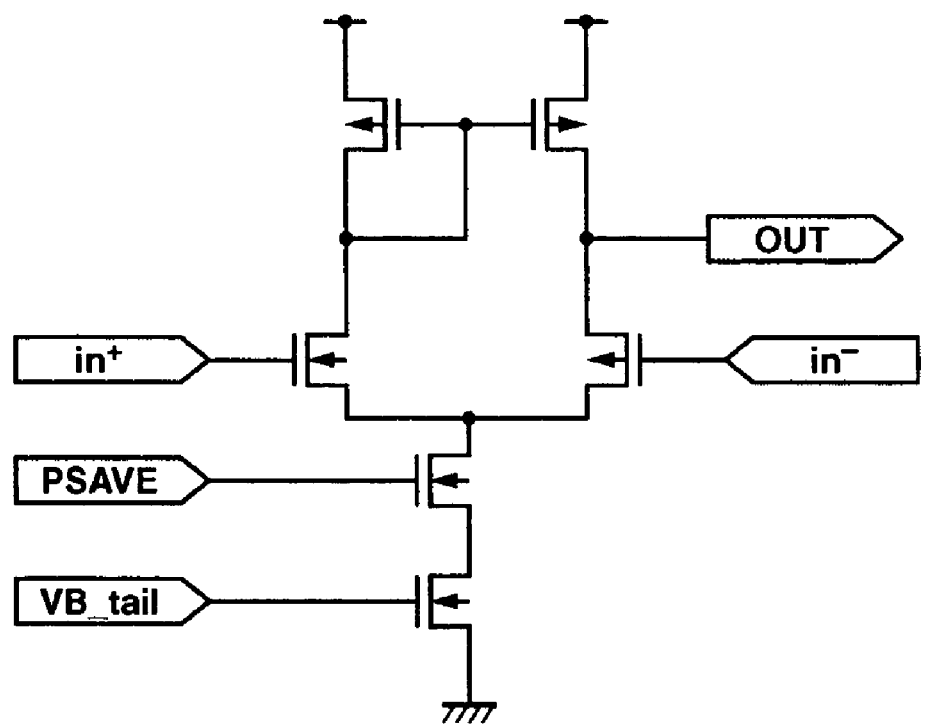
FIG. 3 is a diagram showing an equivalent circuit of an operational amplifier included in the image capture device according to the first embodiment.

FIG. 3 is a diagram showing an equivalent circuit of the operational amplifier 120. The operational amplifier 120 has a single-stage differential amplification circuit structure and includes a noninverting input terminal in+, an inverting input terminal in−, an output terminal OUT, a constant current bias terminal VB_tail, and a terminal PSAVE for an on/off changeover switch. The on/off changeover switch is used to set the operational amplifier 120 to an active state or a nonactive state. One advantage of the operational amplifier 120 configured as described above is that, since the storage capacitor 112 directly severs as a capacitance for determining a frequency band of the operational amplifier 120, it is unnecessary to additionally provide a phase compensation capacitor. This point is discussed in detail below.

The amplification MOSFET 104, which serves as a pixel driver, is provided inside a pixel and is, therefore, usually relatively small in size. Accordingly, the amplification MOSFET 104 allows only a current of several μA (microampere) to several dozen μA to flow. In addition, the vertical output line 106 has a capacitance of approximately several pF (picofarad). Accordingly, a pixel output signal read out onto the vertical output line 106 usually converges in a period of the order of μs (microsecond). Therefore, the required gain-bandwidth product of the operational amplifier 120 is only several MHz at most (for example, 10 MHz or less).

If the gain-bandwidth product of the operational amplifier 120 is large and the frequency bandwidth thereof is wide at the time of operation, a bandwidth corresponding to noise generated by the operational amplifier 120 also becomes wide, thereby lowering the S/N ratio of the image capture device.

In addition, if a phase margin obtained when the closed-loop gain of the operational amplifier 120 becomes "1" is less than 45 degrees, there is a high possibility of oscillation occurring. Therefore, a phase compensation capacitor is usually added to the circuit configuration so as to lower the frequency of a main pole and stabilize operation. For the above-described reason, in order to implement an image capture device having a high S/N ratio and operational stability, it is very important to additionally provide a phase compensation capacitor so as to appropriately limit a frequency band of the operational amplifier 120.

The main pole of the operational amplifier 120 of the first embodiment, which is composed of a single-stage differential amplifier, is defined by a reciprocal of the product of a load capacitance and output resistance of the output terminal. The output resistance is a value of resistance obtained by parallel-connected output resistances of a pMOSFET and an nMOSFET which are connected to the output terminal. With regard to the load capacitance, since a pulse signal PTS is in a high-level state for a period from the beginning of clamping of a dark signal to the end of storing of a signal into the storage capacitor 112, as shown in the timing chart of FIG. 2, the storage capacitor 112 is connected to the output of the operational amplifier 120 for that period, thereby acting as a phase compensation capacitor. It is especially significant that the storage capacitor 112 is connected to the output of the operational amplifier 120 at the moment of the beginning of clamping of a dark signal and at the moment of the end of storing of a signal. The reason for this is that the amount of noise to be finally applied to the storage capacitor 112 is determined by frequency bands obtained at those moments.

In addition, with regard to the size of the storage capacitor 112, it is desirable that, as described above, the frequency band of the operational amplifier 120 is limited up to several MHz. Therefore, the storage capacitor 112 should have a capacitance value of the order of 0.1 to 10 pF, which can vary depending on output resistance characteristics of an MOS device in the employed manufacturing process.

Figure 9:
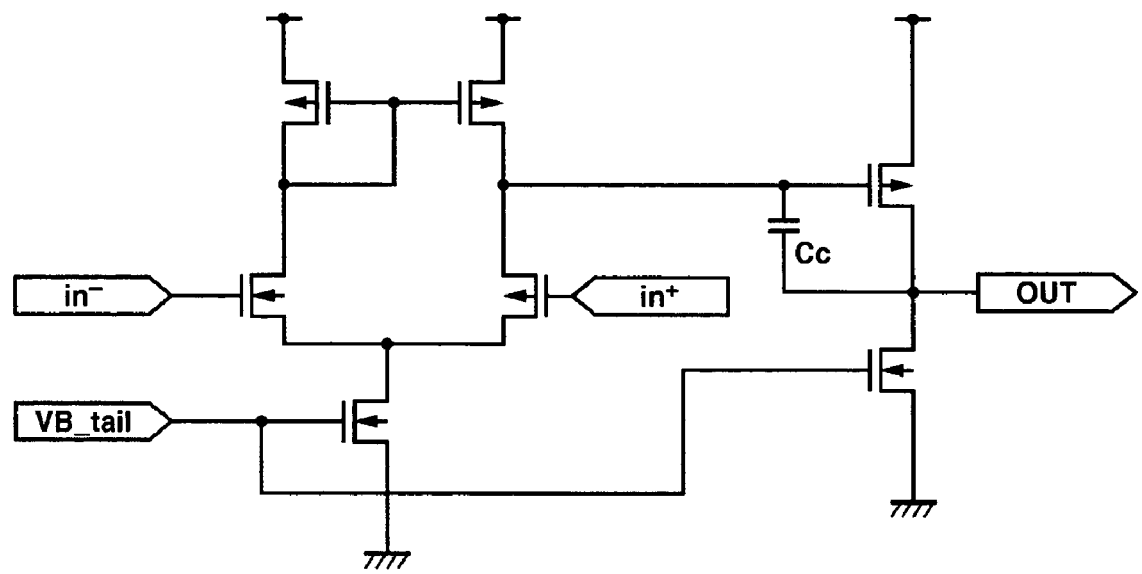
FIG. 9 is a diagram showing a typical two-stage operational amplifier.

In cases where the operational amplifier 120 has a single-stage configuration as in the present embodiment, the storage capacitor 112 itself can function as a phase compensation capacitor. On the other hand, in a typical operational amplifier having a two-stage configuration such as that shown in FIG. 9, it is necessary to additionally provide a phase compensation capacitor Cc separately from a storage capacitor. This results in an increase in chip area, which is disadvantageous in terms of cost.

Furthermore, in the operational amplifier 120 of the first embodiment, a consumption current is constant regardless of operating points, and the rate of removal of a power source voltage is high owing to the feedback action of the operational amplifier 120. Accordingly, a problem with the conventional image capture device with respect to signal crosstalk occurring on a horizontal signal output line can be solved.

Moreover, driving the terminal PSAVE with timing shown in FIG. 2 allows the operational amplifier 120 to be turned on only for a necessary horizontal blanking period. This allows for not only decrease of power consumption but also reduction of heat generation caused by the action of the operational amplifier 120, hot carrier generation, and light emission caused by recombination thereof. Accordingly, it is possible to prevent noise from increasing due to the above causes, particularly, in the case of a shooting operation having a long integration period, so that image quality can be remarkably improved.

More specifically, in the first embodiment, the operational amplifier 120 is provided in a stage before the horizontal output line 116 and is, therefore, near the pixel as compared with a case where an operational amplifier is provided in a stage after the horizontal output line 116. Accordingly, the influence of noise may occur. However, since the operational amplifier 120 is turned on only for a necessary horizontal blanking period, the influence of noise can be reduced.

Figure 8:
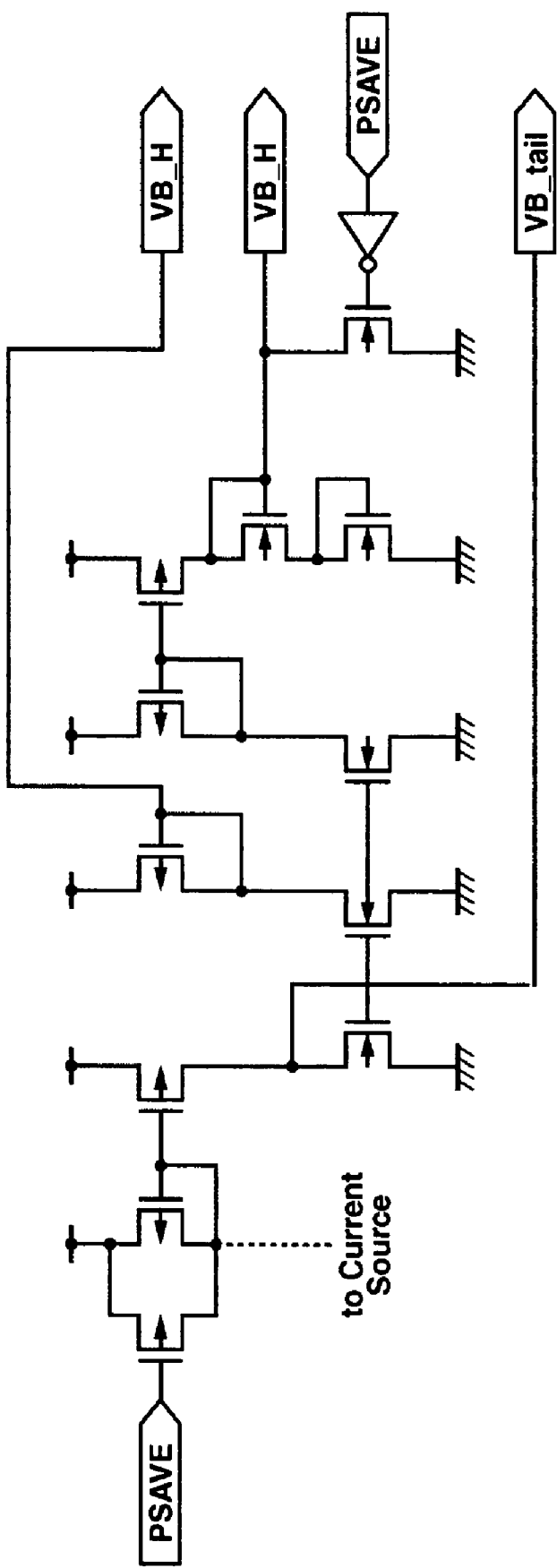
FIG. 8 is a diagram showing an equivalent circuit of a bias generating circuit that supplies a bias voltage to the operational amplifier included in the image capture device according to the first embodiment.

FIG. 8 is a diagram showing an equivalent circuit of a bias generating circuit that supplies a bias voltage to the operational amplifier 120. The bias generating circuit itself can also be the cause of the above-mentioned heat generation, hot carrier generation and light emission caused by recombination thereof. Therefore, turning on and off the bias generating circuit in accordance with control signals PSAVE as shown in FIG. 8 is more effective in reducing the influence of noise. In this case, if it is necessary to keep the stability of bias, a control signal different from the control signals PSAVE may be used.

Figure 7:
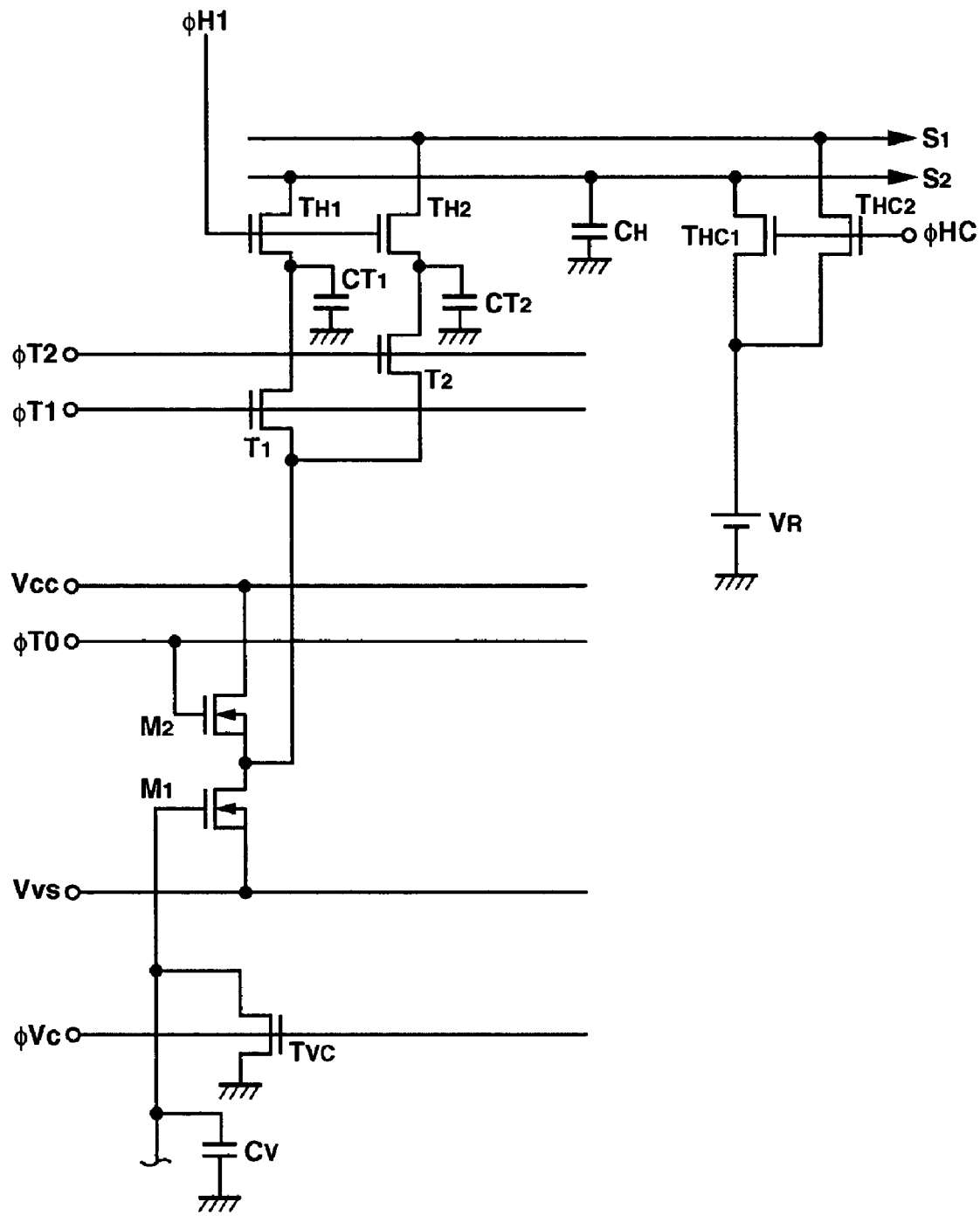
FIG. 7 is a diagram showing an equivalent circuit of a conventional image capture device.

A conventional photoelectric converter (shown in FIG. 7) disclosed in Japanese Laid-Open Patent Application No. 2-296470, in which an amplification stage is provided between pixels and storage capacitors, has low-noise characteristics but has the following problems in addition to the above-described problem with processing speed.

The first problem is that the performance for removal of noise caused by dark signal error in pixels is not so high. Signals stored in the storage capacitors CT1 and CT2 are read out to the output lines S1 and S2 at capacitance split ratios CT1/(CT1+CH1) and CT2/(CT2+CH2), respectively, where CH1 is the parasitic capacitance of the output line S1 and CH2 is the parasitic capacitance of the output line S2. It is difficult to make the capacitances CT1 and CT2 or the capacitances CH1 and CH2 absolutely equal to each other, because of manufacture variations and layout limitations. Accordingly, errors may occur in the capacitance split ratio, thereby limiting noise removal performance.

The second problem is that, since a consumption current in an amplifier composed of the MOS transistors M1 and M2 varies depending on operating points, voltage drop occurring on wiring lines for power supply voltages Vcc and Vvs varies depending on operating points. Accordingly, the power supply voltages Vcc and Vvs that are supplied to the amplifier for each column are affected by the level of a photoelectric signal that is generated in another column. In addition, in the case of this circuit configuration, the performance for removal of a power supply voltage is poor. Accordingly, signal crosstalk is apt to occur on a horizontal signal output line.

The image capture device according to the first embodiment allows for an improved rate of removal of noise resulting from dark signal errors, thereby preventing occurrence of signal crosstalk. Since the number of elements is larger than that in the conventional image capture device, a chip area has a tendency to qualitatively increase. However, considering that the clamping capacitor 108 also serves as a capacitor for defining gain and that the storage capacitor 112 also serves as a phase compensation capacitor, the efficiency of utilization of a chip area is high. Accordingly, a low-cost, high-performance image capture device can be implemented.

Second Embodiment

Figure 4:
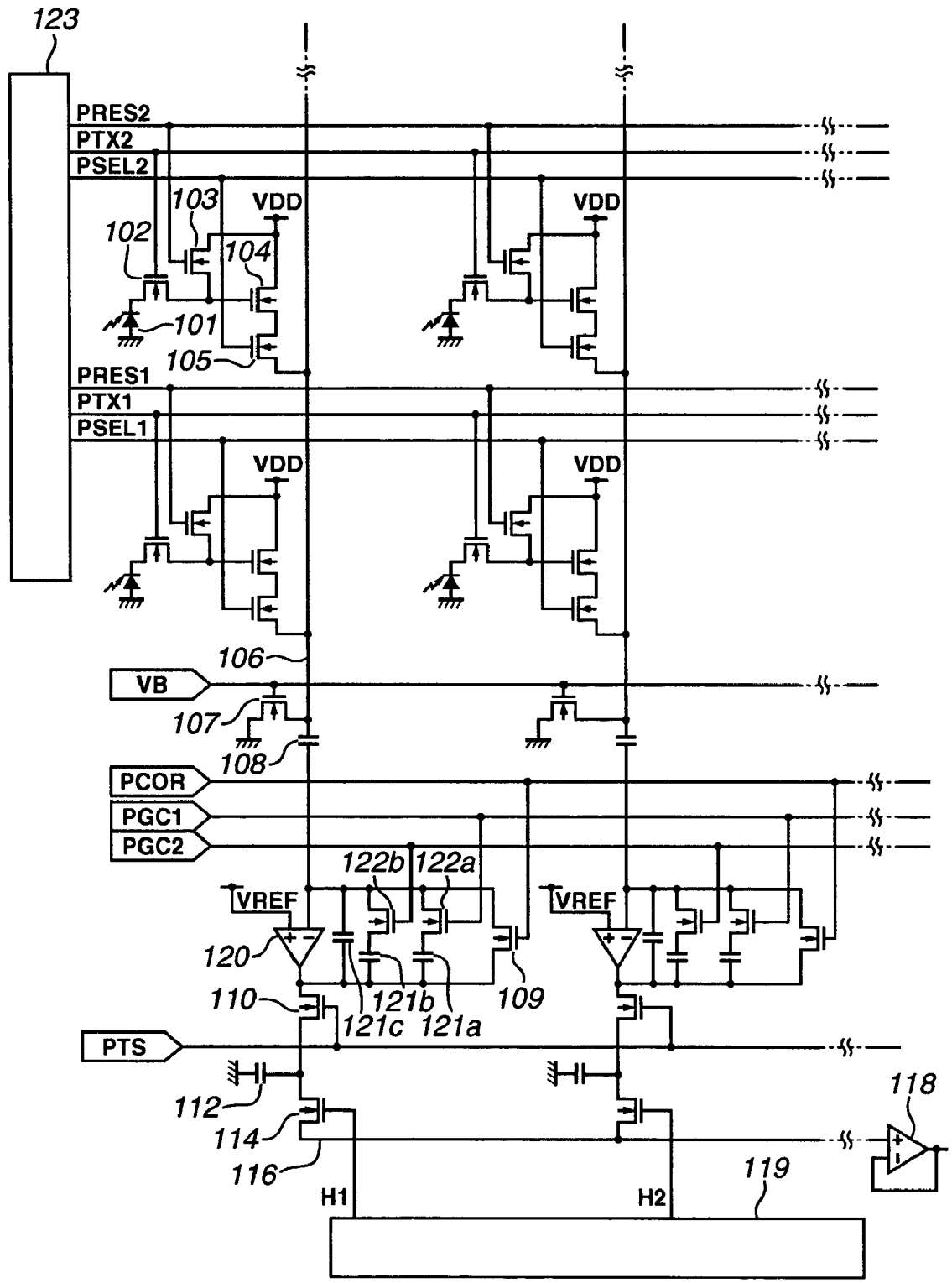
FIG. 4 is a diagram showing an equivalent circuit of an image capture device according to a second embodiment of the invention.

FIG. 4 is a diagram showing an equivalent circuit of an image capture device according to a second embodiment of the invention. In particular, FIG. 4 illustrates a portion of the image capture device associated with 2×2 pixels (image capture elements) among a plurality of two-dimensionally arranged pixels. The pixel portion is the same as in the image capture device of the first embodiment. The image capture device according to the second embodiment is capable of switching sensitivity according to brightness of an object, thereby achieving a wide dynamic range. More specifically, different amplification factors can be set by changing a feedback capacitance value of an amplification stage provided for each column via sensitivity changeover switches 122a and 122b.

In the image capture device according to the second embodiment, capacitance values Cfa, Cfb and Cfc of feedback capacitors 121a, 121b and 121c, respectively, are set as follows:

$$Cfa=C0/2, Cfb=Cfc=C0/4$$

The sensitivity changeover switches 122a and 122b are controlled according to sensitivity control pulses PGC1 and PGC2, respectively. With this configuration, one of voltage amplification factors of 1, 2 and 4 can be accurately selected and set. As the voltage amplification factor increases, the influence of noise generated at a wide-band output amplifier 118, which is provided in a rear stage, can be relatively alleviated. Accordingly, an S/N ratio can be prevented from deteriorating when an object is dark.

Figure 5:
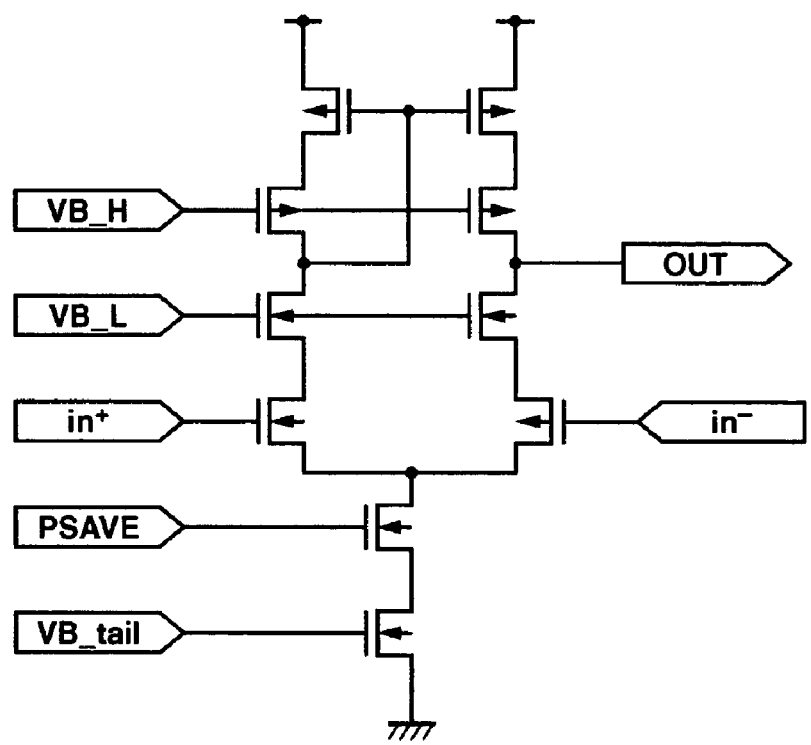
FIG. 5 is a diagram showing an equivalent circuit of an operational amplifier included in the image capture device according to the second embodiment.

On the other hand, as the voltage amplification factor increases, a high open-loop gain is required for the operational amplifier 120. Therefore, the operational amplifier 120 of the second embodiment is configured as a high-gain amplifier circuit of the cascode type such as that shown in FIG. 5. The operational amplifier 120 shown in FIG. 5 includes a noninverting input terminal in+, an inverting input terminal in−, an output terminal OUT, a constant current bias terminal VB_tail, a terminal PSAVE for an on/off changeover switch, a terminal VB_H for a bias voltage to be applied to a grounded-gate pMOSFET, and a terminal VB_L for a bias voltage to be applied to a grounded-gate nMOSFET. While, in the second embodiment, the operational amplifier 120 is a telescopic cascode operational amplifier, it may be a folded cascode operational amplifier in cases where a power supply voltage is low. In the second embodiment, two nMOSFETs and two pMOSFETs are additionally included in the operational amplifier 120 as compared with the first embodiment. However, with regard to a capacitor element occupying a large area, the storage capacitor 112 also serves as a phase compensation capacitor as in the first embodiment. Accordingly, the efficiency of utilization of chip area is high.

The image capture device according to the second embodiment can be applied to an image capture section of a digital camera. In this case, the sensitivity control pulses PGC1 and PGC2 are supplied in association with setting of ISO sensitivity of the digital camera, thereby serving as sensitivity adjustment means. In that event, if gain setting steps are configured to include at least powers of 2, which are commonly used in film cameras, operationality as in film cameras can be obtained. While, in the second embodiment, feedback capacitance values are switched, clamping capacitance values or both feedback capacitance values and clamping capacitance values may be switched.

Third Embodiment

Figure 6:
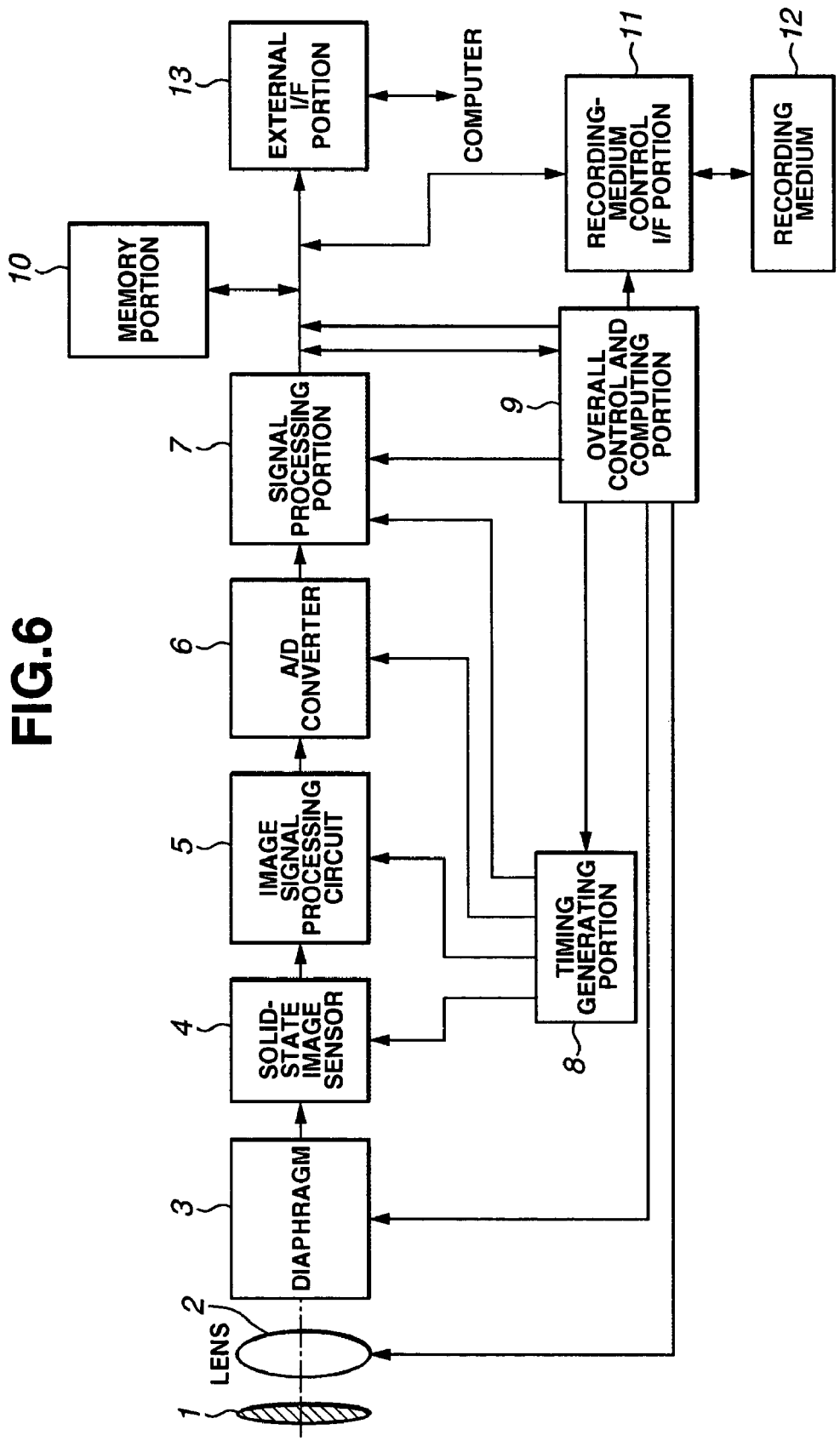
FIG. 6 is a block diagram showing an image capture system according to a third embodiment of the invention.

FIG. 6 is a block diagram showing an image capture system according to a third embodiment of the invention, in which the image capture device according to the first or second embodiment is employed. The image capture system includes a barrier 1, a lens 2, a diaphragm 3, a solid-state image sensor 4, an image signal processing circuit 5, an A/D converter 6, a signal processing portion 7 and a timing generating portion 8.

The barrier 1 is used both as a protector for the lens 2 and a main switch. The lens 2 forms an optical image of an object on the solid-state image sensor 4. The diaphragm 3 varies the amount of light having passed through the lens 2. The solid-state image sensor 4, which corresponds to the image capture device described in the first or second embodiment, converts an object image formed by the lens 2 into an image signal. The image signal processing circuit 5 applies various processing, such as image correction, clamping, etc., to the image signal output from the solid-state image sensor 4. The A/D converter 6 performs analog-to-digital conversion to convert the image signal output from the image signal processing circuit 5 into digital image data. The signal processing portion 7 performs various correction processing and data compression on the digital image data output from the A/D converter 6. The timing generating portion 8 supplies various timing signals to the solid-state image sensor 4, the image signal processing circuit 5, the A/D converter 6 and the signal processing portion 7. It should be noted that the circuit elements 5 to 8 can be integrated into one chip with the solid-state image sensor 4.

The image capture system further includes an overall control and computing portion 9, a memory portion 10, a recording-medium control I/F (interface) portion 11, a detachable recording medium 12 and an external I/F portion 13. The overall control and computing portion 9 performs various computing operations and controls the whole of the image capture system. The memory portion 10 temporarily stores image data. The recording-medium control I/F portion 11 controls recording on and reading from the recording medium 12. The recording medium 12 is, for example, a semiconductor memory to be used for recording and reading of image data. The external I/F portion 13 is configured to communicate with an external computer, etc.

Operation of the image capture system shown in FIG. 6 is described below. When the barrier 1 is opened, the main power supply is turned on. Then, a power supply for control-related circuits is tuned on and a power supply for image-capture-related circuits, such as the A/D converter 6, is turned on. In order to control the amount of exposure, the overall control and computing portion 9 sets the diaphragm 3 fully open. A signal output from the solid-state image sensor 4 is supplied to the A/D converter 6 without being processed by the image signal processing circuit 5. The A/D converter 6 digitizes the signal and supplies the digitized signal to the signal processing portion 7. The overall control and computing portion 9 performs a computing operation on exposure based on data supplied from the signal processing portion 7.

The overall control and computing portion 9 determines brightness of an object based on a result of the above-described light metering, and controls the diaphragm 3 in accordance with the object brightness. Then, the overall control and computing portion 9 performs a computing operation on the distance to the object by using a high-frequency component extracted from the signal output from the solid-state image sensor 4. After that, the overall control and computing portion 9 drives the lens 2 to determine if the lens 2 is in focus. If it is determined that the lens 2 is not in focus, the overall control and computing portion 9 drives the lens 2 again to perform distance metering.

After it is determined that the lens 2 is in focus, the overall control and computing portion 9 causes the image capture system to start main exposure. When the main exposure is completed, an image signal output from the solid-state image sensor 4 is subjected to correction processing, etc., at the image signal processing circuit 5. The image signal output from the image signal processing circuit 5 is converted into digital image data by the A/D converter 6. The digital image data is supplied to the signal processing portion 7. The image data processed by the signal processing portion 7 is temporarily stored in the memory portion 10 under the control of the overall control and computing portion 9. After that, image data stored in the memory portion 10 is recorded on the detachable recording medium 12 via the recording-medium control I/F portion 11 under the control of the overall control and computing portion 9. In addition, image data stored in the memory portion 10 can be transmitted to an external computer or the like via the external I/F portion 13 for further image processing.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-021689 filed Jan. 29, 2004, which is hereby incorporated by reference herein.

What is claimed is:

1. An image capture device comprising:
   a plurality of image capture elements for capturing an object image, each image capture element including:
      a photoelectric conversion element;
      an amplification transistor which outputs a signal based on a charge generated by a photodiode;
      a reset switch for resetting an input to the amplification transistor to a predetermined voltage; and
      a transfer switch for transferring a charge generated by the photodiode;
   a plurality of vertical output lines for reading signals out of the plurality of image capture elements;
   a plurality of processing circuits, each processing circuit including:
      a first capacitor element having a first electrode connected to one of the plurality of vertical output lines;
      an amplifier having a first input terminal connected to a second electrode of the first capacitor element;
      a second capacitor element connected between the first input terminal and an output terminal of the amplifier; and
      a first switch configured to control conduction between the first input terminal and the output terminal of the amplifier;
   a plurality of third capacitor elements configured to hold signals from the amplifiers of the plurality of processing circuits, a first terminal of each third capacitor element receiving signals from the amplifier; and
   a horizontal output line for sequentially outputting signals from the first terminals of the plurality of third capacitor elements;
   wherein the first switch is turned off after the reset switch is turned off, and the transfer switch is turned on after the first switch is turned off.

2. An image capture device according to claim 1, further comprising amplification factor changing means for changing an amplification factor of the amplifier.

3. An image capture device according to claim 1, wherein a gain-bandwidth product of the amplifier is 10 MHz or less.

4. An image capture device according to claim 1, wherein each of the plurality of third capacitor elements has a capacitance value of 0.1 to 10 pF.

5. An image capture device according to claim 1, wherein the amplifier comprises a single-stage differential amplification circuit.

6. An image capture device according to claim 1, wherein the first switch sets the amplifier to an active state or an inactive state according to a control signal.

7. An image capture device according to claim 1, wherein the amplifier is a differential amplifier.

8. The image capture device according to claim 1, further comprising a transfer gate for controlling conduction between the output terminal of the amplifier and the first terminal of the third capacitor element;
   wherein each of the image capture elements further includes a row selection switch for controlling conduction between a source electrode of the amplification transistor and one of the vertical output lines; and
   wherein the first switch is turned off after the selection switch is turned on, the transfer switch is turned off after the first switch is turned off, and the transfer gate is turned off after the transfer switch is turned off.

9. An image capture system comprising:
   a plurality of image capture elements for capturing an object image, each image capture element including:
      a photoelectric conversion element;
      an amplification transistor which outputs a signal based on a charge generated by a photodiode;
      a reset switch for resetting an input to the amplification transistor to a predetermined voltage; and
      a transfer switch for transferring a charge generated by the photodiode;
   a plurality of vertical output lines for reading signals out of the plurality of image capture elements;
   a plurality of processing circuits, each processing circuit including:
      a first capacitor element having a first electrode connected to one of the plurality of vertical output lines;
      a amplifier having a first input terminal connected to a second electrode of the first capacitor element;
      a second capacitor element connected between the first input terminal and an output terminal of the amplifier; and
      a first switch configured to control conduction between the first input terminal and the output terminal of the amplifier;
   a plurality of third capacitor elements configured to hold signals from the amplifiers of the plurality of processing circuits, a first terminal of each third capacitor element receiving signals from the amplifier; and a horizontal output line for sequentially outputting signals from the first terminals of the plurality of third capacitor elements;

wherein the first switch is turned off after the reset switch is turned off, and the transfer switch is turned on after the first switch is turned off;

a lens configured to form an image on the plurality of image capture elements;

an A/D converter configured to digitize a signal read out of the plurality of image capture elements; and a control portion configured to provide control to cause the signal digitized by the A/D converter to be stored in a memory.

* * * * *